United States Patent [19]
Mickowski et al.

[11] Patent Number: 6,090,424
[45] Date of Patent: *Jul. 18, 2000

[54] FLAVORED INSTANT COFFEE PRODUCTS HAVING VARIEGATED APPEARANCE COMPRISING MIXTURES OF DIFFERENT COLORED AGGLOMERATED PARTICLES

[75] Inventors: Christopher Michael Mickowski, Loveland; Jeffrey Alan Sargent, West Chester, both of Ohio

[73] Assignee: The Procter & Gamble Company, Cincinnati, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/689,543

[22] Filed: Aug. 9, 1996

[51] Int. Cl.⁷ .............................. A23L 1/27; A23C 9/00; A23F 5/00
[52] U.S. Cl. ..................... 426/285; 426/249; 426/594; 426/453
[58] Field of Search .............. 426/96, 596, 534, 426/540, 249, 453, 285, 554; 99/323.3

[56] References Cited

U.S. PATENT DOCUMENTS

| | | | |
|---|---|---|---|
| 3,419,399 | 12/1968 | Earle, Jr. et al. | 99/71 |
| 3,458,319 | 7/1969 | Block et al. | 99/71 |
| 3,472,658 | 10/1969 | Isaacs | 99/26 |
| 3,637,397 | 1/1972 | Menzies et al. | 99/65 |
| 3,652,293 | 3/1972 | Lombana et al. | |
| 3,687,683 | 8/1972 | Kaplan et al. | 99/71 |
| 4,076,847 | 2/1978 | Johnson et al. | 426/78 |
| 4,242,364 | 12/1980 | Buddemeyer et al. | 426/98 |
| 4,428,970 | 1/1984 | Laudano | 426/385 |
| 4,438,147 | 3/1984 | Hedrick, Jr. | 426/570 |
| 4,497,835 | 2/1985 | Winston Adolph | 426/72 |
| 4,529,610 | 7/1985 | Blake et al. | |
| 4,554,167 | 11/1985 | Sorge et al. | 426/285 |
| 4,594,256 | 6/1986 | Zemelman et al. | 426/594 |
| 4,594,257 | 6/1986 | Leblanc et al. | 426/594 |
| 4,594,258 | 6/1986 | Vitti et al. | 426/594 |
| 4,748,028 | 5/1988 | McKenna et al. | 426/130 |
| 4,980,181 | 12/1990 | Camp et al. | 426/98 |
| 5,185,175 | 2/1993 | Loh et al. | 426/631 |
| 5,264,228 | 11/1993 | Pray et al. | 426/285 |
| 5,338,555 | 8/1994 | Caly | 426/96 |
| 5,433,962 | 7/1995 | Stipp . | |

FOREIGN PATENT DOCUMENTS 2095270  11/1972  France .

*Primary Examiner*—Anthony J. Weier
*Attorney, Agent, or Firm*—Karen F. Clark; Jacobus C. Rasser

[57] ABSTRACT

Flavored instant coffee products having a variegated appearance that contain darker colored agglomerated soluble particles comprising a darker colored flavorant selected from cocoa and instant coffee agglomerated onto an edible carrier such as sugar and lighter colored agglomerated soluble particles containing a dairy or nondairy creamer and a noncoffee flavor agglomerated onto an edible carrier such as sugar, provided that when the darker colored flavorant is only cocoa, the lighter colored agglomerated particles further contain instant coffee agglomerated the edible carrier.

11 Claims, No Drawings

FLAVORED INSTANT COFFEE PRODUCTS HAVING VARIEGATED APPEARANCE COMPRISING MIXTURES OF DIFFERENT COLORED AGGLOMERATED PARTICLES

TECHNICAL FIELD

The present application relates to flavored instant coffee. More specifically, the present application relates to a rapidly soluble flavored instant coffee having a variegated appearance that enhances desired flavor characteristics.

BACKGROUND OF THE INVENTION

A relatively new entrant to the instant coffee market is flavored instant coffee. Typically, a flavored instant coffee contains a mixture of instant coffee particles, creamer, sweetener, and flavorings. A key challenge in flavored instant coffee products is to provide the right amount and balance of coffee and characteristic flavor, e.g., vanilla, chocolate, hazelnut. Increasing the coffee and characteristic flavor perception without increasing the level of the respective flavor ingredient or throwing the flavor equilibrium out of balance can be difficult. Other key product attributes, primarily creaminess and sweetness perception, and solubility also need to be maintained.

Current flavored instant coffee products on the market provide an essentially uniform appearance in terms of color and particle size. A variegated appearance in both color and particle size for flavored instant coffee powders can be desirable in enhancing the various flavor components, e.g., having brown clusters mixed in a white powder to enhance the coffee and vanilla flavor perception respectively or having brown clusters mixed in a reddish chocolate powder to enhance the coffee and chocolate raspberry flavor perception, respectively. However, achieving the right variegated appearance in a flavored instant coffee is not a trivial task. Simply mixing darker and lighter colored particles of different sizes will not provide a contrasting color appearance because the smaller flavor particles (i.e., the cocoa, coffee and other flavors) tend to uniformly coat the larger particles (typically sugar and creamer). In addition, when much larger particles are mixed together with a fine powder, the larger particles tend to segregate out of the mixture, forming a layer on top of the powder. Therefore, it would be desirable to have the smaller particles be agglomerated in such a way that they remain attached to the specific particles they are agglomerated to, yet easily disintegrate in solution. In addition, it would be desirable to be able to agglomerate the particles such that two distinct, separate colored streams are obtained that do not segregate when combined.

Various methods are known for agglomerating powders, each producing an agglomerate that is physically and visually unique. Agglomeration can improve solubility by increasing both wetting time and porosity. However, if agglomeration results in particles that are too dense or strong, it can have the opposite effect, i.e., reduce solubility. Further, if the agglomerated particles are too coarse, specific attributes such as creaminess and sweetness that are important to flavored instant coffee products can be perceived as being lower in the agglomerated products. Therefore, it would be desirable to have a particular particle size distribution that allows certain agglomerated particles that enhance the flavor attributes to be visible, yet maintains a somewhat powdery form without significant particle segregation.

A dense, strong agglomerate is desirable for a flavored instant coffee product. Particle strength is important in maintaining the desired particle size distribution and appearance. The bulk density of the agglomerated product should also allow a dosage equivalent to the unagglomerated (powder) form of the product containing the same ingredients. In addition, agglomerates having these characteristics still need to be rapidly soluble in water.

DISCLOSURE OF THE INVENTION

The present invention relates to flavored instant coffee products having a variegated appearance. These flavored instant coffee products comprise a mixture of:

a. from about 10 to about 90% of a first portion of (typically darker) colored soluble agglomerated particles having a particle size distribution such that 100% of the particles pass through a 10 mesh screen, from about 10 to about 35% of the particles are on a 16 mesh screen, from about 30 to about 70% of the particles pass through a 16 mesh screen and are on a 45 mesh screen, and from 0 to about 40% of the particles pass through a 45 mesh screen, the first portion of colored agglomerated particles comprising at least one darker colored flavorant selected from cocoa and instant coffee agglomerated onto a first edible carrier; and b. from about 10 to about 90% of a second portion of (typically lighter) colored soluble agglomerated particles differing in color or shade of color from the first portion of colored agglomerated particles and having a particle size distribution such that 100% of the particles pass through a 12 mesh screen, from about 5 to about 25% of the particles are on a 16 mesh screen, from about 20 to about 70% of the particles pass through a 16 mesh screen and are on a 45 mesh screen, and from about 15 to about 60% of the particles pass through a 45 mesh screen, the second portion of colored agglomerated particles comprising a dairy or nondairy creamer and a flavorant other than instant coffee agglomerated onto an edible carrier, provided that when the darker colored flavorant is only cocoa, the second portion of colored agglomerated particles further comprise instant coffee agglomerated onto the edible carrier.

The present invention further relates to a process for making these instant coffee products. This process comprises the steps of:

a. providing a first (typically darker) colored mixture comprising from about 10 to about 40% of at least one darker colored flavorant selected from cocoa and instant coffee, and from about 60 to about 90% of a first edible carrier;

b. adding from about 5 to about 10% of an agglomerating fluid to the first colored mixture;

c. agglomerating the first colored mixture after step (b) to form first colored agglomerated particles;

d. drying the first colored agglomerated particles to a moisture content of about 3.5% or less;

e. sizing the dried first colored agglomerated particles to provide sized first colored agglomerated particles having a particle size distribution such that 100% of the particles pass through a 10 mesh screen, from about 10 to about 35% of the particles are on a 16 mesh screen, from about 30 to about 70% of the particles pass through a 16 mesh screen and are on a 45 mesh screen, and from 0 to about 40% of the particles pass through a 45 mesh screen;

f. providing a second (typically lighter) colored mixture differing in color or shade of color from the first colored mixture and comprising from about 35 to about 75% of a dairy or nondairy creamer, from about 1 to about 10% of a flavorant other than instant coffee, and from about 25 to about 65% of a second edible carrier, provided that when the darker colored flavorant is only cocoa, the second colored mixture further comprises from about 10 to about 30% instant coffee;

g. adding from about 5 to about 10% of an agglomerating fluid to the second colored mixture;

h. agglomerating the second colored mixture after step (g) to form a second colored agglomerated particles;

i. drying the second colored agglomerated particles to a moisture content of about 3.5% or less;

j. sizing the dried second colored agglomerated particles to provide sized second colored agglomerated particles having a particle size distribution such that 100% of the particles pass through a 12 mesh screen, from about 5 to about 25% of the particles are on a 16 mesh screen, from about 20 to about 70% of the particles pass through a 16 mesh screen and are on a 45 mesh screen, and from about 15 to about 60% of the particles pass through a 45 mesh screen; and i. combining from about 10 to about 90% of the sized first colored agglomerated particles with from about 10 to about 90% of the second lighter colored agglomerated particles to provide a mixture of first and second colored agglomerated particles.

By agglomerating specific portions of the formulation, a variegated appearance is produced in the flavored instant coffee products of the present invention that enhances the characteristic flavor impression of these products compared to similar flavored instant coffee products on the market that do not have a variegated appearance. In addition, by controlling the particle size of the agglomerates, the creaminess and sweetness perception of the flavored instant coffee product is maintained while flavor variation from use to use is minimized. Controlling the particle size distribution of the respective agglomerates also enhances the variegated appearance of the product and prevents significant segregation of the two colored portions of agglomerates into two distinct phases.

In addition, the flavored instant coffee products formed according to the present invention can have a density similar to that of flavored instant coffee products on the market with equal or improved solubility. The process of the present invention forms mixtures of different colored agglomerates that are strong and do not break up easily during handling and shipping. Agglomeration of the different colored mixtures is also accomplished according to the process of the present invention so as to avoid degradation of the flavor characteristics of the respective components, especially the cocoa and other flavorants.

DETAILED DESCRIPTION OF THE INVENTION

A. Definitions

As used herein, the terms "instant coffee" and "soluble coffee" are used interchangeably to refer to coffee products that are relatively soluble in water, especially hot water.

"Bulk density" refers to the overall density of a plurality of particles measured in the manner described on pp. 127–131 of COFFEE PROCESSING TECHNOLOGY, Avi Publishing Company, Westport, Conn., 1963, Vol. II.

The terms "moisture" and "water" are used interchangeably herein.

"PSD" means particle size distribution as defined on pp. 137–140 of COFFEE PROCESSING TECHNOLOGY, Avi Publishing Company, Westport, Conn., 1963, Vol. II.

All particle sizes referred to herein are based on the U.S. Standard Sieve Screen Series. See page 701 of Sivetz & Desrosier, COFFEE TECHNOLOGY (Avi Publishing Co. 1979).

As used herein, the term "porosity" refers to a measure of the void space in the agglomerates determined by Hg pore symmetry. See pages 205–224 of Lowell and Shields, POWDER SURFACE AREA AND POROSITY, (Chapman and Hall 1984).

As used herein, the term "agglomerate friability" refers to how easily the agglomerated particle chips or breaks up during processing operations, as reflected by the change in mean particle size distribution (PSD) of the agglomerated particles after being subjected to the "drum test." The drum test measures the robustness of the agglomerate granule when subjected to low shear and simulates low shear processing conditions that can occur in unit operations such as flow from a bin during packaging. In carrying out this test, the agglomerates are placed in a rotating drum containing curved veins and rotated for several minutes so that the agglomerated particles can impact and rub against each other as the drum is rotated. The agglomerate friability is then determined by PSD analysis.

As used herein, the term "foam" refers to a light frothy mass formed in or on the surface of a liquid.

As used herein, the term "dissolution time" refers to the time it takes to solubilize the flavored instant product after an aqueous solution is placed in the receptacle containing the product and stirred.

As used herein, color differences are defined in terms of readings measured on a Hunter colorimeter and specifically the values $L^*$, $a^*$ and $b^*$ derived from the Hunter CIE scale. See pages 985–95 of R. S. Hunter, "Photoelectric Color Difference Meter," *J. of the Optical Soc. of Amer.*, Volume 48, (1958).

As used herein, the term "characteristic color" refers to the color that typically corresponds to the products flavor, e.g., a vanilla product's characteristic color is white, a chocolate product's characteristic color is chocolate and a hazelnut product's characteristic color is light brown.

As used herein, the term "comprising" means various components and processing steps can be conjointly employed in the flavored instant coffee products and process of the present invention. Accordingly, the term "comprising" encompasses the more restrictive terms "consisting essentially of" and "consisting of."

All amounts, parts, ratios and percentages used herein are by weight unless otherwise specified.

B. Sources of Ingredients Used in Agglomerated particles

The instant coffee used in the agglomerated particles of the present invention can be prepared by any convenient process. A variety of such processes are known to those skilled in the art. Typically, instant coffee is prepared by roasting and grinding a blend of coffee beans, extracting the roast and ground coffee with water to form an aqueous coffee extract, and drying the extract to form instant coffee. Instant coffee useful in the present invention is typically obtained by conventional spray drying processes. Representative spray drying processes that can provide suitable instant coffee are disclosed in, for example, pages 382–513 of Sivetz & Foote, COFFEE PROCESSING TECHNOLOGY, Vol. I (Avi Publishing Co. 1963); U.S. Pat. No. 2,771,343 (Chase et al), issued Nov. 20, 1956; U.S. Pat. No. 2,750,998 (Moore), issued Jun. 19, 1956; and U.S. Pat. No. 2,469,553 (Hall), issued May 10, 1949, all of which are incorporated by reference. Other suitable processes for providing instant coffee for use in the present invention are disclosed in, for example, U.S. Pat. No. 3,436,227 (Bergeron et al)., issued Apr. 1, 1969; U.S. Pat. No. 3,493,388 (Hair), issued Feb. 3, 1970; U.S. Pat. No. 3,615,669 (Hair et al), issued Oct. 26, 1971; U.S. Pat. No. 3,620,756, (Strobel et al), issued Nov. 16, 1971; U.S. Pat. No. 3,652,293 (Lombana et al), issued Mar. 28, 1972, all of which are incorporated by reference. In addition to spray dried instant coffee powders, instant coffee useful in the present invention can include freeze-dried coffee. The instant coffee can be prepared from any single variety of coffees or a blend of different varieties. The instant coffee can be decaffeinated or undecaffeinated and can be processed to reflect a unique flavor characteristic such as expresso, French roast, or the like.

The cocoa used in the agglomerated particles of the present invention can be natural or "Dutched" chocolate, or washed or fermented cocoa, from which a substantial portion of the fat or cocoa butter has been expressed or removed by solvent extraction, by pressing, or by other means. Cocoa suitable for use in the present invention can contain from about 0.5 to about 20% fatty constituents. Dutched chocolate is prepared by treating cocoa nibs with alkaline material such as potassium carbonate in a manner well known in the art. Generally, it tends to have a darker color and also can be more flavorful than natural cocoas. Fermented cocoa powder can also be used in the present invention. This cocoa is prepared by fermenting green cocoa beans before roasting and milling. The fermentation is usually conducted by soaking the green beans in water for a week and then drying. Chocolate can be used as the cocoa source in the present invention and it is intended, therefore, that chocolate, as described above, be encompassed by the term "cocoa." When chocolate is used, it should be in a finely divided form. The cocoa should be heat treated to sterilize it. Any conventional pasteurization oven or pasteurization equipment for solids can be used to sterilize the cocoa. Heating the cocoa to about 110° C. for 1.5 hours to 3 hours is usually sufficient to kill bacteria, yeasts and molds.

The flavorants other than cocoa and instant coffee useful in making the agglomerated particles of the present invention include any one of the commercially available noncoffee flavors. Preferably, such flavors are sourced from encapsulated or liquid flavors. These noncoffee flavors can be natural or artificial in origin. Preferred noncoffee flavors include almond nut, amaraetto, anisette, brandy, cappuccino, mint, cinnamon, cinnamon almond, creme de menthe, grand mariner, peppermint stick, pistachio, sambuca, apple, chamomile, cinnamon spice, creme, creme de menthe, vanilla, french vanilla, Irish creme, kahlua, lemon, macadamia nut, orange, orange leaf, peach, strawberry, grape, raspberry, cherry, coffee, chocolate and the like, aroma enhancers such as acetaldehyde, herbs, spices, as well as mixtures of these flavors.

Suitable creamers for use in the agglomerated particles of the present invention include dairy creamers, non-dairy creamers, synthetic and imitation dairy products, non-fat and whole milk solids. The creamer can be made from a variety of fats and oils including soybean and partially hydrogenated soybean oil, partially hydrogenated canola oil, hydrogenated and partially hydrogenated coconut oil, as well as other hydrogenated vegetable oils, or combinations of such oils. Preferred creamers include non-dairy creamers made from vegetable oils, emulsifier, carbohydrates, sodium caseinate, and buffers. Additional creamers suitable for use in the present invention include those synthetic and imitation dairy products disclosed in KIRK OTHMER ENCYCLOPEDIA OF CHEMICAL TECHNOLOGY, W. J. Harper, Willey Interscience, 3rd edition, Vol. 22, section entitled "Synthetic and Imitation Dairy Products," pp. 465–498, (1978).

Agglomerated particles according to the present invention can further comprise thickening agents. These thickening agents include natural and synthetic gums such as locust bean gum, guar gum, gellan gum, xanthan gum, gum ghatti, modified gum ghatti, tragacanth gum, carrageenan, and/or anionic polymers derived from cellulose such as carboxymethylcellulose, sodium carboxymethylcellulose, and cellulose gel (Avicel™). These thickening agents enhance the body and mouthfeel characteristics of the flavored instant coffee products of the present invention, as well as helping to prevent sedimentation of the product when reconstituted, particularly when cocoa used in the formulation. These thickening agents can also be incorporated into these agglomerated particles as part of the creamer.

Suitable edible carriers for use in the agglomerated particles of the present invention include any of a variety of conventional solid materials that are suitable for use in edible products, so long as the carrier does not impart any undesirable off-flavors. These edible carriers can include starches such as corn starch and potato starch, derivatives of starch such as dextrin and maltodextrin, cellulose and its derivatives, such as sodium carboxymethyl cellulose, ethyl cellulose, and cellulose acetate, malt, gelatin, and sugars and sugar alcohols. Preferred edible carriers for use in the present invention are sugars and sugar alcohols such as sucrose, fructose, dextrose, maltose, lactose, high fructose corn syrup solids, invert sugar, sugar alcohols, including sorbitol, as well as mixtures of these sugars and sugar alcohols. For agglomerated particles of the present invention that are to be used in low calorie flavored instant coffee products, lower calorie sweeteners, either alone or combination with other caloric sweeteners such as sugars can be used. These low calorie sweeteners include saccharin, cyclamates, acetosulfam K (Sunette™), L-aspartyl-L-phenylalanine lower alkyl ester sweeteners (e.g., aspartame); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethylalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986; and the like and mixtures thereof. A particularly preferred lower calorie sweetener is aspartame.

Suitable dyes for use in the agglomerated particles of the present invention can be any of a variety of food grade dyes such as FD&C Red #40, FD&C Red Lake #40, FD&C Yellow #5, FD&C Yellow Lake #5, FD&C Yellow #6, Blue #1, Natural Caramel Colorant, N&A Chocolate Dye, as well as mixtures these dyes.

C. Making Colored Agglomerated Particles

In order to provide flavored instant coffee products having a variegated appearance with the desired physical attributes, the various ingredients are agglomerated according to the present invention to form two agglomerate streams that differ in color or shade of color such that two streams provide a distinct, contrasting visual appearance when mixed, blended or otherwise combined together. Typically, one of the agglomerate streams formed provides darker colored agglomerates, while the other stream formed provides lighter colored agglomerates. Accordingly, the following description will refer to these two agglomerate streams as darker colored agglomerates and lighter colored agglomerates. However, it should be understood that other agglomerate streams that provide a distinct, contrasting visual appearance are also within the scope of the present invention.

Initially, darker colored and lighter colored mixtures of the ingredients are formed separately. The darker colored mixture of ingredients comprises from about 10 to about 40%, preferably from about 25 to about 35%, of a darker colored flavorant selected from cocoa and instant coffee, and from about 60 to about 90%, preferably from about 70 to about 80%, of an edible carrier. For chocolate flavored instant coffee products, this darker colored mixture typically comprises coffee. This darker flavored mixture can also optionally comprise additional ingredients, including from about 1 to about 10%, preferably from about 3 to about 5%, flavorants other than cocoa and instant coffee, dyes, and the like.

The lighter colored mixture of ingredients comprises from about 35 to about 75%, preferably from about 50 to about 65%, of a dairy or non dairy creamer, from about 1 to about 10%, preferably from about 4 to about 6%, of a flavorant other than instant coffee, and from about 25 to about 65%, preferably from about 30 to about 50%, of an edible carrier. For chocolate flavored instant coffee products, this lighter colored mixture typically further comprises from about 3 to about 10%, preferably from about 4 to about 6%, cocoa. This lighter colored mixture can optionally include additional ingredients, such as thickeners, at levels up to about 5%, preferably from about 2 to about 3%, dyes, and the like.

To each of the darker and lighter colored mixtures is added from about 5 to about 10%, preferably from about 7 to about 8% of an agglomerating fluid. Suitable agglomerating fluids wet the individual ingredient particles and thus cause the individual ingredient particles to adhere to each other, so as to form larger sized agglomerated particles. Suitable agglomerating fluids include water, steam, aqueous solutions of sucrose, aqueous solutions of maltodextrin, concentrated solutions of flavor oils, and food grade alcohols such as ethanol. Water is the preferred agglomerating fluid.

Once the agglomerating fluid has been added to either the darker or lighter colored mixtures, the respective mixtures are then agglomerated by agitating the ingredients through mechanical or fluid action for a period of time sufficient to make either darker colored agglomerated particles or lighter colored agglomerated particles. During agglomeration, the agglomerating fluid, e.g., water, is uniformly distributed throughout the particles to be agglomerated, causing part or all of the particles to become tacky. As the particles are agitated, the tacky particles contact and adhere to other particles. Proper control of the amount of agglomerating fluid and the type and time of agitation will provide control over the final size and strength of the agglomerated particles.

The darker and lighter colored agglomerated particles that are formed are subsequently dried to a moisture content of from about 3.5% or less, preferably about 2.5% or less, to minimize flavor deterioration and caking. The agglomerated particles can be air dried, vacuum dried, dried in a fluidized bed, dried in a vibratory fluidized bed, or the like. Preferably, darker agglomerated particles comprising sugar and instant coffee are vacuum dried to induce puffing to increase the porosity, thus improving the solubility of the flavored instant coffee product.

D. Sizing and Combining Dried Agglomerated Particles

After drying, the darker and lighter colored agglomerated particles are sized to modify the density and particle size distribution of the final flavored instant coffee product. The darker colored agglomerated particles are sized to deliver a targeted agglomerated particles having a particle size distribution such that 100% of the particles pass through a 10 mesh (preferably through a 12 mesh) screen, from about 10 to about 35% (preferably from about 15 to about 25%) of the particles are on a 16 mesh screen, from about 30 to about 70% (preferably from about 45 to about 55%) of the particles pass through a 16 mesh screen and are on a 45 mesh screen, and from 0 to about 40% (preferably from about 25 to about 35%) of the particles pass through a 45 mesh screen. The lighter colored agglomerated particles are sized to deliver agglomerated particles having a particle size distribution such that 100% of the particles pass through a 12 mesh (preferably a 14 mesh) screen, from about 5 to about 25% (preferably from about 10 to about 20%) of the particles are on a 16 mesh screen, from about 20 to about 70% (preferably from about 40 to about 60%) of the particles pass through a 16 mesh screen and are on a 45 mesh screen and from about 15 to about 60% (preferably from about 25 to about 45%) of the particles pass through a 45 mesh screen.

Sizing the darker and lighter colored streams can be achieved by use of vibrating screens, grinders, compactors, or the like. Achieving a particular particle size distribution for each of the streams is important for increasing the bulk density. The darker and lighter colored streams are also typically sized so that the lighter colored stream provides a finer particle size distribution to enhance the creamy flavor, creamy mouthfeel and sweetness perception of the resultant product. However, because agglomerated particles of different sizes tend to segregate when handled or packed, the particle size distribution of the respective darker and lighter colored streams are not widely different and preferably match each other as closely as possible to minimize variation in flavor from use to use, while still providing the desired visual appearance.

The darker and lighter colored sized agglomerate streams are then mixed, blended, or otherwise combined together in a paddle, drum, screw, plough type mixer, or the like to provide the final flavored instant coffee product having a variegated appearance. The final flavored instant coffee product comprises from about 10 to about 90%, preferably from about 20 to about 40%, of the darker colored agglomerated particles and from about 10 to about 90%, preferably from about 60 to about 80%, of the lighter colored agglomerated particles. The two agglomerate streams are typically combined together to form a substantially uniform mixture of darker and lighter colored agglomerated particles such that a distinct, contrasting visual appearance is obtained.

Both the dark and light agglomerated particles have good particle friability characteristics that are reflective of agglomerate strength. When measured by the drum test, the mean particle size reduction for these agglomerated particles is typically about 5% or less. This shows the agglomerated particles are strong enough to withstand low shear processing conditions such as flow from the bin, package filling and vibration during shipping, and will maintain the desired variegated appearance when the package is opened by the consumer.

To determine whether the two colored streams provide a distinct, contrasting visual appearance when combined together, the color of each of the darker and lighter colored streams can be characterized by using the Hunter CIE scale that provides tri-stimulus color values $L^*$, $a^*$ and $b^*$. The $L^*$ value represents the light to dark axis, a value of 100 being 100% white and a value of 0 representing 100% black on the Hunter CIE scale. The lighter colored stream has $L^*$ values greater than the darker colored stream, and preferably has a minimum difference of 5 L* units between the two streams so that a noticeably distinct, contrasting visual appearance is obtained when the two streams are combined. Accordingly, L* values can be used to determine whether the two separate streams provide a distinct, contrasting visual appearance when combined together.

The a* value represents the red to green axis on the Hunter CIE scale. The darker colored streams typically have a* values greater than the lighter colored streams due to the coffee and cocoa in the darker colored streams that have greater a* values and are redder in color than the creamer and carrier (e.g., sugar) in the lighter colored stream. Accordingly, a* values can also be used to determine whether the two separate streams provide a distinct, contrasting visual appearance when combined together.

The b* value represents the yellow to blue axis on the Hunter CIE scale with positive values representing more yellow color and negative values representing more blue color. Because both darker and lighter colored streams contain ingredients having a yellowish tint (e.g., creamers, coffee and cocoa), the b* value will be positive for each of these streams. Even so, b* values can be useful in determining whether the two separate streams provide a distinct, contrasting visual appearance when combined together.

The particle size distribution of the agglomerated particles in the final flavored instant coffee product after the two colored streams have been combined together is preferably from about 1 to about 25% on a 16 mesh screen, from about 30 to about 60% on a 45 mesh screen, and from about 25 to about 60% through a 45 mesh screen, more preferably from about 5 to about 15% on a 16 mesh screen, from about 45 to about 55% on a 45 mesh screen, and from about 35 to about 45% through a 45 mesh, screen. The bulk density of the final product is typically from about 0.25 to about 0.70 g/cc, preferably from about 0.40 to about 0.60 g/cc. The solubility of the agglomerated particles in the final product is typically at least equivalent to that of the unagglomerated (powder) product comprising the same ingredients. The agglomerated particles in the final product are also strong enough to maintain the desired variegated visual appearance and particle size distribution during processing and packaging of the product.

EXAMPLES

The following examples illustrate instant coffee products having a variegated appearance made according to the present invention.

Example 1

Vanilla Flavored Foaming Instant Coffee
A) Darker Colored Agglomerated Particles To a Hobart mixer is added 65% sucrose and 35% instant soluble coffee. The ingredients are blended into a uniform mixture. Water (6%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.
B) Lighter Colored Agglomerated Particles To a Hobart mixer is added 28% sucrose, 30% non dairy foaming creamer, 36% non fat milk solids, 2.5% carboxymethyl cellulose and 3.5% vanilla flavor system. The ingredients are blended into a uniform mixture. Water (7%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

C) Finished Product

To a tumble cement mixer is added 30% of the darker colored agglomerated particles and 70% of the lighter characteristic colored agglomerated particles. The agglomerated particles are mixed to obtain the variegated finished product appearance. The appearance of the finished product can best be described as a coarse white powder with dark brown clusters mixed in. The predominate coarse white powder enhances the perception of the vanilla flavor while the dark brown clusters enhance the perception of the coffee flavor. The finished product had a bulk density of 0.41 g/cc and dissolved (13 g/180 ml in 82° C. distilled water) in 20 seconds with no visible sediment forming. The product had an initial foam height of 7 ml (foam height measured by placing 7.5 g/18⁰ ml in 82° C. distilled water, stirring for 20 seconds and pouring into a graduated cylinder) and maintained a foam height of 6 ml (determined by measuring foam height in graduated cylinder after 15 minutes).

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 42 | 8.5 | 21.4 | 20 | 29 | 23 | 12 | 10 | 6 |
| Lighter | 93.2 | −2.8 | 10.2 | 19 | 27 | 13 | 16 | 21 | 4 |
| Combined[1] | 68 | 3.5 | 12.5 | 11 | 21 | 30 | 15 | 18 | 5 |

[1]Hunter color average of the lighter and darker particles as seen by the instrument.

Example 2

Chocolate Flavored Foaming Instant Coffee
A) Darker Colored Agglomerated Particles To a Hobart mixer is added 65% sucrose and 35% instant soluble coffee. The ingredients are blended into a uniform mixture. Water (6%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.
B) Lighter Colored Agglomerated Particles To a Hobart mixer is added 36% of a mixture of fructose and sucrose, 21% dairy foaming creamer, 21% non fat milk solids, 12% of a milk solid, 4% dutched lecithinated cocoa (10–12% fat), 3% carboxymethyl cellulose and 3% chocolate mocha flavor system. The ingredients are blended into a uniform mixture. Water (6.5%) is added and the mixture is agitated until the desired agglomerated particles are formed. The resulting agglomerated particles are placed in a vacuum oven at 90° F. (33° C.) and 4.5 TORR (mm HG) to reduce the moisture content below 3.5%. The dried agglomerated particles are then sized so as to pass through a 14 mesh screen.
C) Finished Product To a 1 gallon glass jar is added 30% of the dark agglomerated particles and 70% the of lighter colored agglomerated particles. The agglomerated particles are mixed to obtain a variegated finished product appearance. The appearance of the finished product can best be described as a coarse light chocolate powder with dark brown clusters mixed in. The predominate coarse light chocolate powder enhances the perception of the chocolate flavor while the dark brown clusters enhance the perception of the coffee flavor. The finished product had a bulk density of 0.39 g/cc and dissolved in 10 seconds with slight sediment forming. The product has an initial foam height of 5 ml and maintains a foam height of 4 ml.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 40.5 | 11.4 | 26.5 | 21 | 31 | 20 | 11 | 8 | 9 |
| Lighter | 58.9 | 8.0 | 12.3 | 10 | 19 | 19 | 21 | 27 | 4 |
| Combined | 65.5 | 5.7 | 10.5 | 12 | 22 | 23 | 16 | 21 | 6 |

Example 3

Chocolate Raspberry Flavored Foaming Instant Coffee

A) Darker Colored Agglomerated Particles

To a Hobart mixer is added 65% sucrose and 35% instant soluble coffee. The ingredients are blended into a uniform mixture. Water (8%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

B) Lighter Colored Agglomerated Particles

To a Hobart mixer is added 33.6% of a mixture of fructose and sucrose, 18.6% non dairy foaming creamer, 25% non fat milk solids, 11.7% milk solids, 4.4% dutched lecithinated cocoa (10–12% fat), 2.9% carboxymethyl cellulose, 0.1% food grade red dye and 3.7% chocolate raspberry mocha flavor system. The ingredients are blended into a uniform mixture. Water (6.3%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 14 mesh screen.

C) Finished Product

To a 1 gallon glass jar is added 30% of the darker agglomerated particles and 70% the of lighter colored agglomerated particles. The agglomerated particles are mixed to obtain the variegated finished product appearance. The appearance of the finished product can best be described as a coarse light reddish-chocolate powder with dark brown clusters mixed in. The predominate coarse reddish-chocolate powder enhances the perception of the chocolate raspberry flavor while the dark brown clusters enhance the perception of the coffee flavor. The finished product had a bulk density of 0.43 g/cc and dissolved in 15 seconds with slight sediment forming. The product had an initial foam height of 4 ml and maintained a foam height of 2 ml.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 42 | 8.5 | 21.4 | 19 | 31 | 23 | 10 | 11 | 6 |
| Lighter | 51.2 | 13.1 | 13.5 | 14 | 38 | 25 | 12 | 9 | 2 |
| Combined | 45.6 | 13 | 20.3 | 14 | 36 | 24 | 15 | 10 | 1 |

Example 4

Hazelnut Flavored Foaming Instant Coffee

A) Darker Colored Agglomerated Particles

To a Hobart mixer is added 65% sucrose and 35% instant soluble coffee. The ingredients are blended into a uniform mixture. Water (8%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

B) Lighter Colored Agglomerated Particles

To a Hobart mixer is added 24.8% sucrose, 32% non dairy foaming creamer, 32% non fat milk solids, 5.9% instant soluble coffee, 2.5% carboxymethyl cellulose and 2.8% hazelnut mocha flavor system. The ingredients are blended into a uniform mixture. Water (6.5%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 14 mesh screen.

C) Finished Product

To a 1 gallon glass jar is added 30% of the darker agglomerated particles and 70% the of lighter colored agglomerated particles. The agglomerated particles are mixed to obtain the variegated finished product appearance. The appearance of the agglomerated product can best be described as a coarse light brownish powder with dark brown clusters mixed in. The predominate coarse light brownish powder enhances the perception of the hazelnut flavor while the dark brown clusters enhance the perception of the coffee flavor. The finished product had a bulk density of 0.38 g/cc and dissolved in 10 seconds with no visible sediment forming. The product had an initial foam height of 10 ml and maintained a foam height of 7 ml.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 40.5 | 11.4 | 26.5 | 21 | 31 | 20 | 11 | 8 | 9 |
| Lighter | 74.5 | 2.8 | 16.2 | 12 | 30 | 16 | 16 | 18 | 8 |
| Combined | 64.5 | 4.6 | 17.9 | 14 | 33 | 17 | 14 | 14 | 8 |

Example 5

Vanilla Flavored Instant Coffee

A) Darker Colored Agglomerated Particles

To a Hobart mixer is added 65% sucrose and 35% of an instant soluble coffee. The ingredients are blended into a uniform mixture. Water (6%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

B) Lighter Colored Agglomerated Particles

To a Hobart mixer is added 28% sucrose, 66% non dairy creamer, 2.5% carboxymethyl cellulose and 3.5% vanilla flavor system. The ingredients are blended into a uniform mixture. Water (7%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

C) Finished Product

To a 1 gallon glass jar is added 30% of the darker colored agglomerated particles and 70% the of lighter colored agglomerated particles. The agglomerated particles are mixed to obtain a variegated finished product appearance similar to that of Example 1. The product had a bulk density of 0.40 g/cc and dissolved in 20 seconds with no visible sediment forming.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 42 | 8.5 | 11.2 | 17 | 29 | 21 | 15 | 12 | 6 |
| Lighter | 94.5 | −2.6 | 11.2 | 18 | 35 | 24 | 9 | 9 | 5 |
| Combined | 68 | 3.5 | 12.5 | 15 | 30 | 20 | 18 | 20 | 6 |

Example 6

Chocolate Flavored Instant Coffee

A) Darker Colored Agglomerated Particles

To a Hobart mixer is added 65% sucrose and 35% of an instant soluble coffee. The ingredients are blended into a uniform mixture. Water (6%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

B) Lighter Colored Agglomerated Particles

To a Hobart mixer is added 34% of a mixture of fructose and sucrose, 55% of a mixture of non dairy and dairy creamer, 4% dutched lecithinated cocoa (10–12% fat), 3.0% carboxymethyl cellulose and 4.0% chocolate mocha flavor system. The ingredients are blended into a uniform mixture. Water (6.25%) is added and the mixture is agitated until the desired agglomerated particles are formed. The resulting agglomerated particles are placed in a vacuum oven at 90° F. (33° C.) and 4.5 TORR (mm HG) to reduce the moisture content below 3.5%. The dried agglomerated particles are then sized so as to pass through a 14 mesh screen.

C) Finished Product

To a 1 gallon glass jar is added 30% of the darker colored agglomerated particles and 70% the of lighter colored agglomerated particles. The agglomerated particles are mixed to obtain a variegated finished product appearance similar to that of Example 2. The product had a bulk density of 0.44 g/cc and dissolved in 10 seconds with a slight sediment forming.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 42 | 8.5 | 11.2 | 17 | 29 | 21 | 15 | 12 | 6 |
| Lighter | 51.9 | 10 | 15 | 18 | 46 | 22 | 7 | 5 | 2 |
| Combined | 50.2 | 7.1 | 16.3 | 25 | 38 | 21 | 8 | 6 | 2 |

Example 7

Chocolate Flavored Instant Coffee

A) Darker Colored Agglomerated Particles

To a Hobart mixer is added 83% sucrose, 13% of a dutched lecithinated cocoa (10–12% fat) and 4% chocolate flavor system. The ingredients are blended into a uniform mixture. An agglomerating solution formed from a 60/40 mixture of sucrose and water (6.5%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 10 mesh screen.

B) Lighter Colored Agglomerated Particles

To a Hobart mixer is added 23% fructose, 57% non dairy creamer, 15% instant soluble coffee, 3.5% carboxymethyl cellulose and 1.5% mocha flavor system. The ingredients are blended into a uniform mixture. An agglomerating solution formed from a 60/40 mixture of sucrose and water (6.5%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

C) Finished Product

To a 1 gallon glass jar is added 26% of the darker colored agglomerated particles and 74% the of lighter colored agglomerated particles. The agglomerated particles are mixed to obtain a variegated finished product appearance. The appearance of this agglomerated chocolate product can best be described as a coarse medium brown powder with dark chocolate clusters mixed in. The predominate coarse medium brown powder enhances the perception of high coffee flavor while the dark chocolate clusters enhance the perception of the characteristic chocolate flavor. The product had a bulk density of 0.45 g/cc and dissolved in 30 seconds with a slight sediment forming.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 27 | 9.7 | 12 | 31 | 64 | 5 | 0 | 0 | 0 |
| Lighter | 62.5 | 5.0 | 14.4 | 10 | 25 | 25 | 15 | 18 | 7 |
| Combined | 61.4 | 5.0 | 13.5 | 22 | 30 | 20 | 10 | 13 | 5 |

Example 8

Sugar-Free Vanilla Flavored Instant Coffee

A) Darker Colored Agglomerated Particles

To a Hobart mixer is added 72% maltodextrin and 28% instant soluble coffee. The ingredients are blended into a uniform mixture. Water (10%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 10 mesh screen.

B) Lighter Colored Agglomerated Particles

To a Hobart mixer is added 41% maltodextrin, 54% non dairy creamer, 3% carboxymethyl cellulose, 0.5% aspartame and 1.5% vanilla flavor system. The ingredients are blended into a uniform mixture. Water (9%) is added and the mixture is agitated until the desired agglomerated particles are formed. The resulting agglomerated particles are placed in a vacuum oven at 90° F. (33° C.) and 4.5 TORR (mm HG) to reduce the moisture below 3.5%. The dried agglomerated particles are then sized so as to pass through a 12 mesh screen.

C) Finished Product

To a 1 gallon glass jar is added 30% of the darker colored agglomerated particles and 70% the of lighter colored agglomerated particles. The agglomerated particles are mixed to obtain a variegated finished product appearance. The appearance of this finished product can best be described as a coarse white powder with medium brown clusters mixed in. The predominate coarse white powder enhances the perception of characteristic vanilla flavor while the medium brown clusters enhance the perception of high coffee flavor. The clusters are lighter in color than those described in the Examples 1 to 6 due to the whiter characteristic color of the maltodextrin carrier used. The product had a bulk density of 0.39 g/cc and dissolved in 15 seconds with no visible sediment forming.

The color and PSD of the respective darker colored, lighter colored and combined agglomerated particles are shown in the following Table:

|  | Hunter Color | | | PSD (% on) | | | | | |
| --- | --- | --- | --- | --- | --- | --- | --- | --- | --- |
|  | L* | a* | b* | 16 | 30 | 45 | 60 | 100 | pan |
| Darker | 47.5 | 8.2 | 19.6 | 29 | 39 | 21 | 6 | 2 | 3 |
| Lighter | 95 | −1.8 | 7.9 | 15 | 32 | 16 | 16 | 16 | 5 |
| Combined | 74.3 | 34 | 8.4 | 14 | 18 | 9 | 11 | 29 | 18 |

What is claimed is:

1. A flavored instant coffee product having a variegated appearance, which comprises a mixture of:
    a. from about 10 to about 90% of a first portion of colored soluble agglomerated particles having a particle size distribution such that 100% of the particles pass through a 10 mesh screen, from about 10 to about 35% of the particles are on a 16 mesh screen, from about 30 to about 70% of the particles pass through a 16 mesh screen and are on a 45 mesh screen, and from 0 to about 40% of the particles pass through a 45 mesh screen, said first portion of colored agglomerated particles comprising a darker colored flavorant selected from the group consisting of cocoa and instant coffee agglomerated onto a first edible carrier; and
    b. from about 10 to about 90% of a second portion of colored soluble agglomerated particles differing in color or shade of color from said first portion of colored agglomerated particles and having a particle size distribution such that 100% of the particles pass through a 12 mesh screen, from about 5 to about 25% of the particles are on a 16 mesh screen, from about 20 to about 70% of the particles pass through a 16 mesh screen and are on a 45 mesh screen, and from about 15 to about 60% of the particles pass through a 45 mesh screen, said second portion of colored agglomerated particles comprising a creamer and a flavorant other than instant coffee agglomerated onto a second edible carrier, provided that when said darker colored flavorant is only cocoa, said second portion of colored agglomerated particles further comprise instant coffee agglomerated onto said second carrier.

2. The flavored instant coffee product of claim 1 wherein said first portion of colored agglomerated particles are darker colored agglomerated particles having a particle size distribution such that 100% of the particles pass through a through a 12 mesh screen, from about 15 to about 25% of the particles are on a 16 mesh screen, from about 45 to about 55% of the particles pass through a 16 mesh screen and are on a 45 mesh screen, and from about 25 to about 35% of the particles pass through a 45 mesh screen, and wherein said second portion of agglomerated particles are lighter colored agglomerated particles having a particle size distribution such that 100% of the particles pass through a 14 mesh screen, from about 10 to about 20% of the particles are on a 16 mesh screen, from about 40 to about 60% of the particles pass through a 16 mesh screen and are on a 45 mesh screen and from about 25 to about 45% of the particles pass through a 45 mesh screen.

3. The flavored instant coffee product of claim 2 which comprises from about 20 to about 40% darker colored agglomerated particles and from about 60 to about 80% lighter colored agglomerated particles.

4. The flavored instant coffee product of claim 2 wherein the darker colored agglomerated particles and lighter colored agglomerated particles differ in color by at least 5 L* units as measured by the Hunter CIE scale.

5. The flavored instant coffee product of claim 2 which has a bulk density of from about 0.25 to about 0.70 g/cc and wherein the particle size distribution of said agglomerated particles is from about 1 to about 25% on a 16 mesh screen, from about 30 to about 60% on a 45 mesh screen, and from about 25 to about 60% through a 45 mesh screen.

6. The flavored instant coffee product of claim 5 which has a bulk density of from about 0.40 to about 0.60 g/cc and wherein the particle size distribution of said agglomerated particles is from about 5 to about 15% on a 16 mesh screen, from about 45 to about 55% on a 45 mesh screen, and from about 35 to about 45% through a 45 mesh screen.

7. The flavored instant coffee product of claim 2 wherein said lighter colored agglomerated particles further comprise from about 2 to about 3% of a thickening agent selected from the group consisting of locust bean gum, guar gum, gellan gum, xanthan gum, gum ghatti, modified gum ghatti, tragacanth gum, carrageenan, carboxymethylcellulose, sodium carboxymethylellulose, cellulose gel, and mixtures thereof.

8. The flavored instant coffee of claim 2 wherein said first and second edible carriers are selected from the group consisting of corn starch, potato starch, dextrin, maltodextrin, cellulose, sodium carboxymethyl cellulose, ethyl cellulose, cellulose acetate, malt, gelatin, sugars and sugar alcohols.

9. The flavored instant coffee of claim 8 wherein said edible carriers are a sugar selected from the group consisting of sucrose, fructose, dextrose, maltose, lactose, high fructose corn syrup solids, invert sugar, and mixtures thereof.

10. The flavored instant coffee of claim 9 wherein said darker colored agglomerated particles comprise from about 25 to about 35% of said darker colored flavorant and from about 70 to about 80% sugar and wherein said lighter colored agglomerated particles comprise from about 50 to about 65% dairy or non dairy creamer, from about 3 to about 4% of flavorant other than instant coffee and from about 30 to about 50% sugar.

11. The chocolate flavored instant coffee product of claim 10 wherein said lighter colored agglomerated particles further comprise from about 3 to about 10% cocoa.

* * * * *